(12) United States Patent
Egeland et al.

(10) Patent No.: US 11,039,652 B2
(45) Date of Patent: *Jun. 22, 2021

(54) SENSOR MODULE FOR A PROTECTIVE HEAD TOP

(71) Applicant: 3M INNOVATIVE PROPERTIES COMPANY, St. Paul, MN (US)

(72) Inventors: Marc A. Egeland, Minneapolis, MN (US); Steven T. Awiszus, Woodbury, MN (US); Charles P. Jents, Woodbury, MN (US); Benjamin A. Johnson, Woodbury, MN (US); Kiran S. Kanukurthy, Cottage Grove, MN (US); James E. Nash, Bloomington, MN (US); Milo G. Oien-Rochat, Minneapolis, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/741,789

(22) Filed: Jan. 14, 2020

(65) Prior Publication Data

US 2020/0146384 A1 May 14, 2020

Related U.S. Application Data

(63) Continuation of application No. 16/238,709, filed on Jan. 3, 2019, now Pat. No. 10,575,579, which is a
(Continued)

(51) Int. Cl.
*G08B 23/00* (2006.01)
*A42B 3/04* (2006.01)
(Continued)

(52) U.S. Cl.
CPC ............ *A42B 3/0433* (2013.01); *A42B 3/046* (2013.01); *A42B 3/0466* (2013.01); *A42B 3/225* (2013.01);
(Continued)

(58) Field of Classification Search
CPC ..... A42B 3/0433; A42B 3/046; A42B 3/0466; A42B 3/225; H04W 4/80; A62B 9/006; A62B 18/082
(Continued)

(56) References Cited

U.S. PATENT DOCUMENTS 3,362,403 A 1/1968 Fleming
4,549,541 A 10/1985 Sundahl
(Continued)

FOREIGN PATENT DOCUMENTS

CN 205093658 11/2015
DE 10 2015 001 513 3/2016
(Continued)

OTHER PUBLICATIONS

PCT International Search Report from PCT/US2017/038858; dated Sep. 27, 2017, 4 pages.
(Continued)

*Primary Examiner* — Zhen Y Wu
(74) *Attorney, Agent, or Firm* — Steven A. Bern; Christopher D. Karlen

(57) ABSTRACT

The present disclosure includes a retrofit sensor module for use with a protective head top with a helmet and a visor. The sensor module includes a sensor housing and an attachment mechanism. The sensor housing encloses a head presence sensor to sense when the protective head top is being worn. The sensor housing also encloses a position sensor to sense the position of the visor relative to the helmet. The retrofit sensor module further comprises an attachment mechanism
(Continued)

secured to the housing. The attachment mechanism mates with a first hinge component of a hinge assembly in the protective head top to removably install the sensor module into the protective head top, wherein the hinge assembly allows the visor to move relative to the helmet.

28 Claims, 9 Drawing Sheets

Related U.S. Application Data continuation of application No. 15/790,276, filed on Oct. 23, 2017, now Pat. No. 10,206,447, which is a continuation of application No. 15/190,310, filed on Jun. 23, 2016, now Pat. No. 9,848,666.

(51) Int. Cl.
  *A62B 9/00* (2006.01)
  *A62B 18/08* (2006.01)
  *H04W 4/80* (2018.01)
  *A42B 3/22* (2006.01)

(52) U.S. Cl.
  CPC ............ *A62B 9/006* (2013.01); *A62B 18/082* (2013.01); *H04W 4/80* (2018.02)

(58) Field of Classification Search
  USPC ....................................................... 340/573.1
  See application file for complete search history.

(56) References Cited

U.S. PATENT DOCUMENTS

| | | | |
|---|---|---|---|
| 4,619,255 A | 10/1986 | Spinosa et al. | |
| 4,907,296 A * | 3/1990 | Blecha .................. | A42B 3/042 |
| | | | 2/422 |
| 5,189,735 A | 3/1993 | Corona | |
| 5,245,994 A | 9/1993 | Chang | |
| 5,267,708 A * | 12/1993 | Monson ................. | B64D 25/02 |
| | | | 244/121 |
| 5,666,949 A | 9/1997 | Debe | |
| 5,796,341 A | 8/1998 | Stratiotis | |
| 5,990,793 A | 11/1999 | Bieback | |
| 6,186,140 B1 | 2/2001 | Hoague | |
| 6,370,700 B1 * | 4/2002 | Arion ..................... | A42B 3/224 |
| | | | 2/424 |
| 6,456,199 B1 | 9/2002 | Michael | |
| 6,472,988 B1 | 10/2002 | Feld | |
| 6,715,150 B1 * | 4/2004 | Potin ........................ | A42B 3/22 |
| | | | 2/15 |
| 6,732,733 B1 | 5/2004 | Brostrom et al. | |
| 6,734,393 B1 | 5/2004 | Friedl | |
| 6,887,293 B1 | 5/2005 | Abad | |
| 7,019,652 B2 | 3/2006 | Richardson | |
| 7,080,414 B1 * | 7/2006 | Montero ................ | A42B 3/224 |
| | | | 2/424 |
| 7,234,462 B2 | 6/2007 | Palazzotto et al. | |
| 7,358,448 B2 | 4/2008 | Auray et al. | |
| 7,592,911 B1 | 9/2009 | Hudgens | |
| 7,628,443 B2 * | 12/2009 | Krajenke .............. | E05F 1/1238 |
| | | | 16/308 |
| 7,768,409 B2 | 8/2010 | Parias | |
| 7,792,615 B2 | 9/2010 | Aimar | |
| 8,120,857 B2 | 2/2012 | Hedges et al. | |
| 8,294,580 B2 | 10/2012 | Witwer | |
| 8,316,850 B2 | 11/2012 | Grilliot et al. | |
| 8,695,121 B2 * | 4/2014 | Nolan ...................... | A42B 3/24 |
| | | | 2/171.3 |
| 8,821,621 B2 | 9/2014 | Dwyer et al. | |
| 9,486,027 B2 * | 11/2016 | Dey ......................... | A42B 3/04 |
| 2003/0000001 A1 | 1/2003 | McDonald et al. | |
| 2003/0028953 A1 | 2/2003 | Acquaviva | |
| 2004/0004547 A1 | 1/2004 | Appelt | |
| 2004/0100384 A1 | 5/2004 | Chen | |
| 2004/0182385 A1 | 9/2004 | Uusitalo et al. | |
| 2004/0224293 A1 | 11/2004 | Penning et al. | |
| 2005/0114154 A1 | 5/2005 | Wolkowicz | |
| 2006/0044140 A1 | 3/2006 | Berg | |
| 2006/0085367 A1 | 4/2006 | Genovese | |
| 2006/0125623 A1 | 6/2006 | Appelt et al. | |
| 2006/0162036 A1 * | 7/2006 | McCalla ................. | A42B 3/04 |
| | | | 2/6.2 |
| 2006/0216956 A1 * | 9/2006 | Forell .................... | B60J 3/0221 |
| | | | 439/34 |
| 2006/0238877 A1 * | 10/2006 | Ashkenazi .............. | G06F 3/013 |
| | | | 359/630 |
| 2007/0078528 A1 | 4/2007 | Anke | |
| 2007/0101995 A1 | 5/2007 | Chornyj | |
| 2008/0018472 A1 | 1/2008 | Dasilva | |
| 2008/0021919 A1 | 1/2008 | Kaartinen | |
| 2008/0048931 A1 * | 2/2008 | Ben-Ari ............... | G01C 21/165 |
| | | | 345/8 |
| 2008/0241805 A1 | 10/2008 | Schantz | |
| 2008/0302360 A1 | 12/2008 | Chambers | |
| 2009/0125460 A1 | 5/2009 | Hewison | |
| 2009/0210989 A1 | 8/2009 | Becker | |
| 2009/0231423 A1 | 9/2009 | Becker | |
| 2009/0303588 A1 * | 12/2009 | Charlesworth ........ | G02B 7/002 |
| | | | 359/481 |
| 2010/0181940 A1 | 1/2010 | Bucalo | |
| 2010/0064405 A1 * | 3/2010 | McGovern ............. | A42B 3/225 |
| | | | 2/6.7 |
| 2010/0095439 A1 * | 4/2010 | Nolan ...................... | A42B 3/24 |
| | | | 2/421 |
| 2010/0102970 A1 * | 4/2010 | Hertz .................... | A42B 3/046 |
| | | | 340/573.1 |
| 2010/0107292 A1 * | 5/2010 | Chevallier ............. | A42B 3/223 |
| | | | 2/6.2 |
| 2010/0108067 A1 | 5/2010 | Walker et al. | |
| 2010/0132085 A1 * | 6/2010 | Beaudet ................ | A42B 3/228 |
| | | | 2/6.5 |
| 2010/0265169 A1 * | 10/2010 | Baudou .................. | F41G 3/225 |
| | | | 345/156 |
| 2011/0048416 A1 | 3/2011 | Brace et al. | |
| 2011/0056496 A1 | 3/2011 | Tilley | |
| 2011/0227700 A1 | 9/2011 | Hamerly | |
| 2011/0314594 A1 * | 12/2011 | Rogers .................. | G02B 23/12 |
| | | | 2/421 |
| 2012/0084904 A1 * | 4/2012 | Paulson ................ | A42B 3/225 |
| | | | 2/422 |
| 2012/0143526 A1 | 6/2012 | Benzel | |
| 2012/0223833 A1 * | 9/2012 | Thomas ................. | G16H 50/30 |
| | | | 340/539.12 |
| 2013/0031699 A1 * | 2/2013 | Gafforio ................. | A42B 3/226 |
| | | | 2/411 |
| 2013/0063550 A1 | 3/2013 | Ritchey et al. | |
| 2013/0092164 A1 | 4/2013 | Curran et al. | |
| 2013/0144130 A1 | 6/2013 | Russell | |
| 2013/0182414 A1 * | 7/2013 | Fedewa ................ | A42B 3/0446 |
| | | | 362/106 |
| 2013/0291271 A1 | 11/2013 | Becker | |
| 2014/0273863 A1 | 9/2014 | Luizzi | |
| 2014/0319217 A1 * | 10/2014 | Elefante .................... | F41G 3/16 |
| | | | 235/407 |
| 2015/0010158 A1 | 1/2015 | Broadley | |
| 2015/0109129 A1 * | 4/2015 | Merril ................. | G08B 21/0438 |
| | | | 340/573.1 |
| 2015/0181972 A1 * | 7/2015 | Djerassi ................... | A42B 3/22 |
| | | | 2/424 |
| 2016/0018278 A1 | 1/2016 | Jeter | |
| 2016/0044276 A1 * | 2/2016 | Shearman ........... | A61B 5/14553 |
| | | | 348/207.1 |
| 2016/0073722 A1 * | 3/2016 | Eustace ................. | G08B 21/18 |
| | | | 340/539.13 |
| 2016/0085077 A1 * | 3/2016 | Milea .................. | G02B 27/0176 |
| | | | 359/632 |
| 2016/0106174 A1 * | 4/2016 | Chung ................. | A42B 3/0433 |
| | | | 340/539.13 |
| 2016/0199674 A1 * | 7/2016 | Johnson ................. | A62B 18/02 |
| | | | 600/549 |

(56) References Cited

U.S. PATENT DOCUMENTS

| | | |
|---|---|---|
| 2016/0210838 A1 | 7/2016 | Yan et al. |
| 2016/0227866 A1* | 8/2016 | Tal .................... G02B 27/0176 |
| 2016/0227868 A1* | 8/2016 | Mullins ................. A42B 3/221 |
| 2016/0355262 A1* | 12/2016 | Sharma ................ A62B 18/025 |
| 2017/0022807 A1 | 1/2017 | Dursun |
| 2017/0032598 A1 | 2/2017 | Farioli Brioschi et al. |
| 2017/0052000 A1* | 2/2017 | White .................... A42B 3/288 |
| 2017/0215511 A1* | 8/2017 | Albani ................... A42B 3/286 |
| 2017/0273385 A1* | 9/2017 | Scheller .................. A42C 5/00 |
| 2017/0325534 A1* | 11/2017 | Noordzij ............... A42B 3/225 |
| 2017/0330444 A1 | 11/2017 | M R |

FOREIGN PATENT DOCUMENTS

| | | |
|---|---|---|
| GB | 2409961 | 7/2005 |
| JP | H10-262942 | 10/1998 |
| JP | H11-197159 | 7/1999 |
| JP | 2002-015107 | 1/2002 |
| JP | 2003-014847 | 1/2003 |
| JP | 2005-216137 | 8/2005 |
| JP | 2013-257638 | 12/2013 |
| JP | 2014-241119 | 12/2014 |
| KR | 2009-0123644 | 12/2009 |
| KR | 2013-0005424 | 9/2013 |
| KR | 10-2015-0102328 | 9/2015 |
| KR | 10-2015-0006350 | 1/2016 |
| RU | 2532801 | 11/2014 |
| RU | 2552996 | 6/2015 |
| RU | 162541 | 6/2016 |
| WO | WO 95/21334 | 8/1995 |
| WO | WO 2009/141474 | 11/2009 |
| WO | WO 2010/045496 | 4/2010 |
| WO | WO 2016/089708 | 6/2016 |

OTHER PUBLICATIONS

New York Times article ""Pogonip in Pittsburg Air"" published Jan. 12, 1910.

Sandulescu, "Wearable System for Stress Monitoring of Firefighters in Special Missions", The 5$^{th}$ IEEE International Conference on E-Health and Bioengineering—EGB 2015, Nov. 19-21, 2015, pp. 1-4.

Machine Learning from Wikipedia, the free encyclopedia, retrieved from the internet Mar. 16, 2016, pp. 1-13.

* cited by examiner

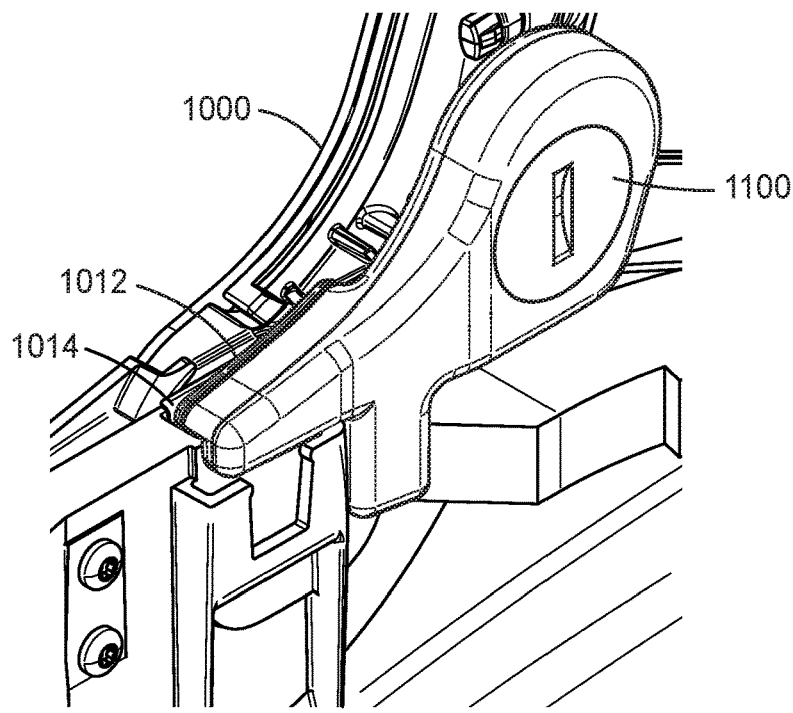
FIG. 10C
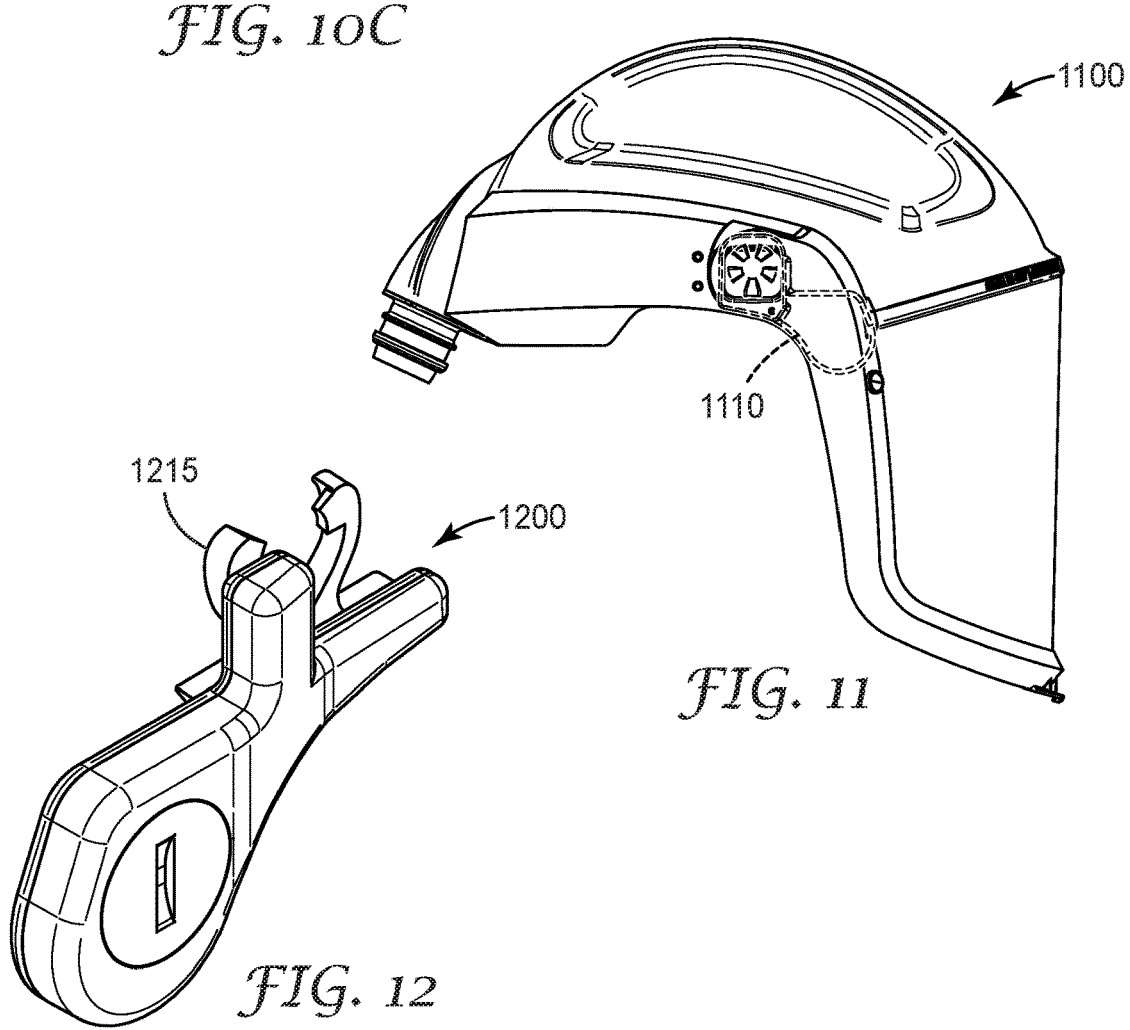
FIG. 11
FIG. 12

SENSOR MODULE FOR A PROTECTIVE HEAD TOP

CROSS REFERENCE TO RELATED APPLICATION

This application is a continuation of U.S. application Ser. No. 16/238,709, filed Jan. 3, 2019, now allowed, which is a continuation of U.S. application Ser. No. 15/790,276, filed Oct. 23, 2017, now granted as U.S. Pat. No. 10,206,447, which is a continuation of U.S. application Ser. No. 15/190,310, filed Jun. 23, 2016, now granted as U.S. Pat. No. 9,848,666, the disclosure of which is incorporated by reference in its entirety herein.

TECHNICAL FIELD

The present disclosure relates to the field of personal protective equipment and a sensor module for retrofitting personal protective equipment. More specifically, the present disclosure relates to a retrofit sensor module for a protective head top.

BACKGROUND

When working in areas where there is known to be, or there is a potential of there being, dusts, fumes, gases or other contaminants that are potentially hazardous or harmful to health, it is usual for a worker to use a respirator or a clean air supply source. While a large variety of respiratory devices are available, some commonly used devices include powered air purifying respirators (PAPR) or a self-contained breathing apparatus (SCBA). A PAPR typically includes a blower system comprising a fan powered by an electric motor for delivering a forced flow of air through a tube to a head top worn by a user. A PAPR typically includes a device (i.e., turbo) that draws ambient air through a filter, forces the air through a breathing tube and into a helmet or head top to provide filtered air to a user's breathing zone, around their nose or mouth. An SCBA provides clean air from a compressed air tank through a tube or hose to the interior of a head top worn by a user.

In many instances, it is important for the user to be confident that their PPE is working correctly. Additionally, safety managers at work locations requiring the use of PPE want to be able to confirm that their employees are using the correct PPE, and that the PPE is being used as intended.

SUMMARY

The present invention provides a retrofit sensor module that can be added to an existing protective head top. A retrofit sensor module consistent with the present disclosure faces the challenges of being easy for the user to install, use and remove on a regular basis, potentially daily basis, without tools or training. These factors therefore required an attachment mechanism that is simple for quick access, yet durable enough to withstand impacts (the device may not be dislodged during a head top impact or during use for any reason), and located such that the device can accomplish all required sensing and information gathering.

The retrofit sensor module can include a variety of features. In at least one embodiment, the retrofit sensor module for use with a protective head top including a visor and a helmet comprises a sensor housing and an attachment mechanism. The sensor housing encloses a head presence sensor to sense when the protective head top is being worn. The sensor housing also encloses a position sensor to sense the position of the visor relative to the helmet. The retrofit sensor module further comprises an attachment mechanism secured to the housing. The attachment mechanism mates with a first hinge component of a hinge assembly in the protective head top to removably install the sensor module into the protective head top, wherein the hinge assembly allows the visor to move relative to the helmet.

In some instances, the sensor housing further encloses a battery.

In some instances, the sensor housing further encloses a temperature sensor to sense ambient temperature in the interior of the protective head top.

In some instances, the sensor housing further encloses an accelerometer to sense movement of the head of an individual wearing the head top.

In some instances, the sensor housing further encloses an audio transducer.

In some instances, the user interface comprises at least one light emitting diode (LED).

In some instances, the attachment mechanism replaces a second hinge component of the hinge assembly.

In some instances, the sensor module does not replace any components of the hinge assembly when installed in the protective head top.

In some instances, the sensor module can be installed without using any tools.

In some instances, the sensor module fits in the interior of the visor of the protective head top when the sensor module is installed in the protective head top and when the visor is in a down position.

In some instances, the sensor module does not impair the performance of the hinge assembly when it is installed in the protective head top.

In some instances, the attachment mechanism is removably secured to the sensor housing.

In some instances, the attachment mechanism is an integral part of or permanently secured to the sensor housing.

In some instances, the battery can be replaced without the use of any tools while the sensor module is installed in the protective head top.

In some instances, the sensor module has an Ingress Protection (IP) rating.

In some instances, the sensor housing further comprises a Bluetooth communication component.

The sensor module of claim 1, wherein the head presence sensor comprises an infrared sensor.

The present disclosure further includes a kit comprising the sensor module as described herein and a personal communication hub, wherein the sensor module communicates with the personal communication hub using Bluetooth.

The present disclosure further includes a kit comprising the sensor module as described herein and the protective head top.

The present disclosure provides many advantages over the prior art. For example, the retrofit sensor module can allow users or owners of protective head tops to efficiently upgrade their head top to detect when the head top visor is open. Further, in some instances, the retrofit sensor module can be installed in the head top without the use of tools.

The present disclosure provides a way to confirm that a user is wearing a protective head top in some instances through the head detection sensor. This information allows managers of safety programs to confirm that users of protective head tops are complying with requirements to wear the protective head tops.

The present disclosure provides the ability to determine what temperature the worker is exposed to within the interior of the head top. This allows for the determination that a worker may be overly hot, that the worker may be experiencing fatigue due to temperature, or even that a blower connected to the head top is not working properly.

The present disclosure provides a way to retrospectively determine whether a visor for a protective head top was in an open position or in a closed position at the time of an event or injury.

The present disclosure can provide a solution that is durable in a work environment based on an Ingress Protection (IP rating).

BRIEF DESCRIPTION OF DRAWINGS

The invention may be more completely understood in consideration of the following detailed description of various embodiments of the invention in connection with the accompanying drawings, in which:

FIGS. 10a-10c show the retrofit sensor module installed in a protective head top.

FIG. 11 shows a retrofit sensor module superimposed onto its installation location in a protective head top.

FIG. 12 shows an alternate embodiment for a retrofit sensor module.

It is to be understood that the embodiments may be utilized and structural changes may be made without departing from the scope of the invention. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
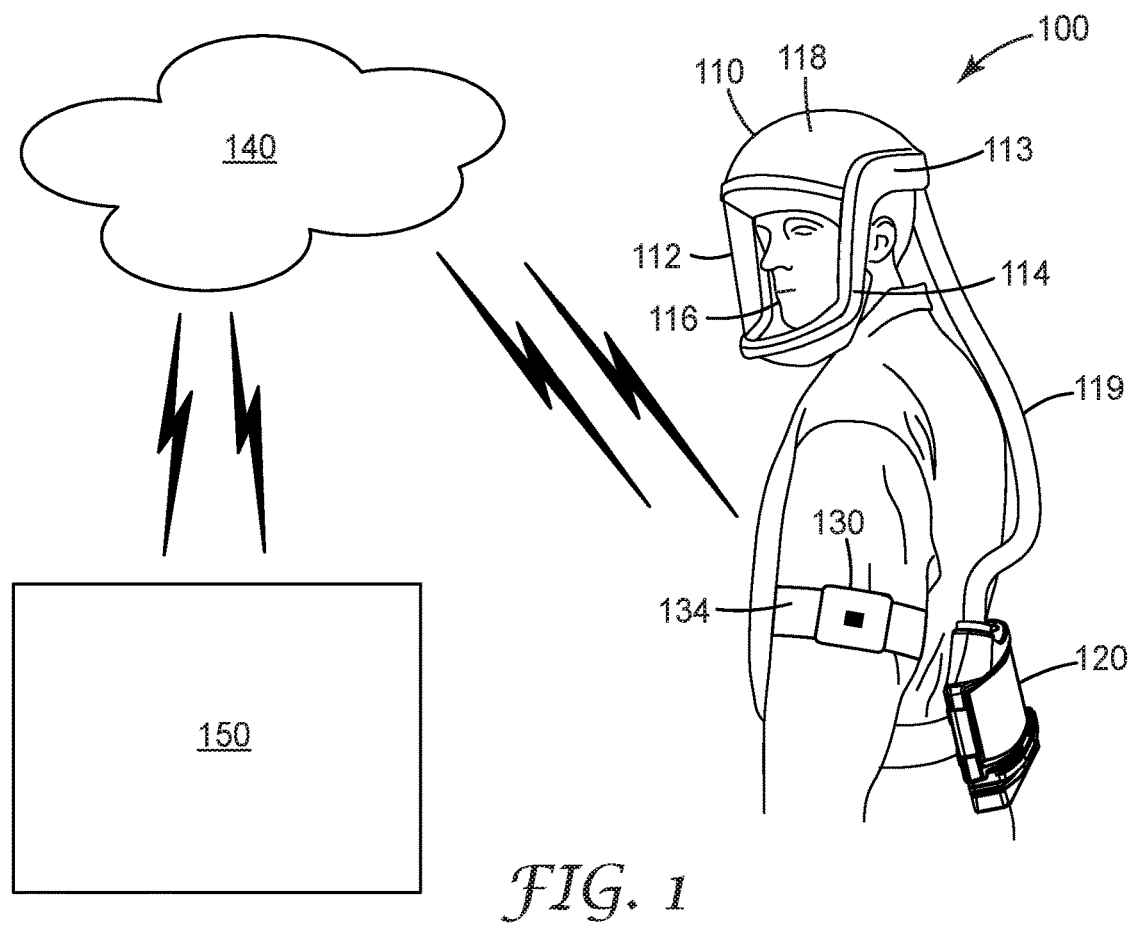
FIG. 1 is a system diagram of a protective head top, a blower and a communication hub.

FIG. 1 is a system 100 diagram of a protective head top 110, a blower 120 and a communication hub 130. Communication hub 130 can communicate with communication modules in blower 120 or in a retrofit sensor module, with beacons or other sensors that may be located in the environment, and with a cloud network 140, which can provide information to a user computing device 150, such as a mobile device, tablet or computer. Protective head top 110 includes a visor 112 that is sized to fit over at least a user's nose and mouth. Visor 112 includes lens 116 which is secured to helmet 118 by the frame assembly 114. Hinge assemblies 113 connect frame assembly 114 to helmet 118 on each side of frame assembly 114. Hinge assemblies 113 allow visor 116 to rotate to an open or closed position relative to helmet 118. Helmet 118 may also be referred to as a shell, and the terms are used interchangeably herein.

As described herein, a retrofit sensor module can be installed into the protective head top such that an attachment mechanism of the retrofit sensor module mates with a component of hinge 113. In some instances the retrofit sensor module may replace a component of hinge 113. Retrofit sensor module may include a variety of sensors and other components, such as a position sensor. When retrofit sensor module is installed in head top 110, the position sensor senses the position of visor 112 relative to helmet 118 to determine if the visor is in an open position or in a closed position. In some instances, a position sensor may detect whether visor 112 is partially open, and if so, what measure (e.g., percent or degree) it is open.

Head top 110 is connected to blower 120 by hose 119. Blower 120 can be any type of air supply source, such as a blower assembly for a powered air purifying respirator (PAPR), an air tank for a self-contained breathing apparatus (SCBA) or any other device that provides air to head top 110. In FIG. 1, blower 120 is a blower assembly for a PAPR. A PAPR is commonly used by individuals working in areas where there is known to be, or there is a potential of there being dusts, fumes or gases that are potentially harmful or hazardous to health. A PAPR typically includes blower assembly, including a fan driven by an electric motor for delivering a forced flow of air to the respirator user. The air is passed from the PAPR blower assembly through hose 119 to the interior of head top 110.

Head top 110, and specifically the helmet 118 of head top 110 may be supported on a user's head by a suspension (not shown).

A retrofit sensor module may include a communication module that allows the retrofit sensor to communicate information with communication hub 130. Communication hub 130 includes a processor, a communication module and a power supply. The communication module of communication hub 130 or of a retrofit sensor module can include any desired communication capability, such as: RFID (including NFC), Bluetooth, including any generations of Bluetooth technology, and WiFi communication capabilities. Communication module of communication hub 130 or of a retrofit sensor module can also include any type of wireless communication capabilities, such as radio frequency or Zigbee communication.

Communication hub 130 may include a user interface, such as a display, lights, buttons, keys (such as arrow or other indicator keys), and may be able to provide alerts to the user in a variety of ways, such as by audibly or visibly generating an alarm or vibrating. In some instances, the user interface of communication hub 130 may be used to control electronic settings for the head top 110 or the blower 120 to allow a user easier access to setting changes, particularly when the blower 120 is worn in a location on the lower back where it can be difficult for the user to reach.

Communication hub 130 can be portable such that it can be carried or worn by a user. Communication hub 130 can also be personal, such that it is used by an individual and communicates with personal protective equipment (PPE) assigned to that individual. In FIG. 1, communication hub 130 is secured to a user using a strap 134. However, communication hub may be carried by a user or secured to a user in other ways, such as being secured to PPE being worn by the user, to other garments being worn to a user, being attached to a belt, band, buckle, clip or other attachment mechanism as will be apparent to one of skill in the art upon reading the present disclosure.

Communication hub 130 can receive information from and communicate information to head top 110 and blower 120. Communication hub 130 sends information to and receives information from a cloud database 140. Such information may include status information about head top 110 and blower 120, information about the movement, temperature, or other pieces of data related to the individual wearing head top 110 and blower 120, and information from other sensors or beacons that may be located in the environment or in communication proximity of head top 110 and blower 120.

A user can access, view and modify information stored in cloud database 140 through a web interface on user computing device 150, such as a personal computer, mobile device or tablet.

Figure 2:
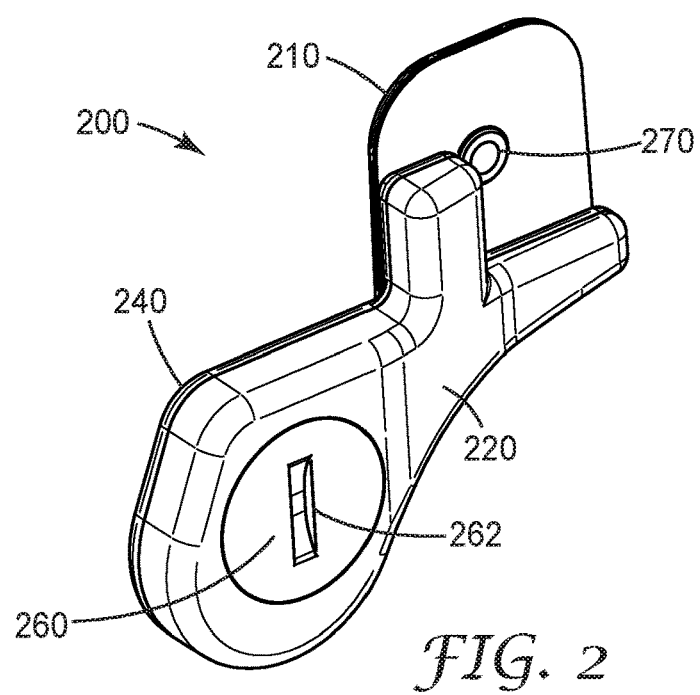
FIG. 2 a perspective view of a retrofit sensor module.

FIG. 2 a perspective view of a retrofit sensor module 200. Retrofit sensor module includes a pivot socket cam 210 (opposite boss 270). Pivot socket cam 210 and boss 270 serve as attachment mechanisms to allow retrofit sensor module 200 to be retained in a protective head top when installed in the protective head top. Pivot socket cam 210 and boss 270 also reproduce the cam action of a component of a hinge assembly to allow the visor to rotate or pivot relative to a helmet in a protective head top in the same manner after a retrofit sensor module 200 is installed as before it was installed.

Retrofit sensor module 200 can have a housing comprised of two sides, housing side 220 and housing side 240. These two portions of the housing (housing side 220 and housing side 240) allow the pieces of housing to be separately molded and later sealed together after a populated printed circuit board is installed in the housing. Multiple portions of a housing can be permanently joined through processes such as use of adhesive, laser welding, ultrasonic welding or any other method of joining or securing components to each other. The housing may also be manufactured through a 3D-printing process. Slotted coin slot cover 260 covers the opening where a small battery, such as a coin cell lithium ion battery can be inserted into the interior of the housing of retrofit sensor module 200. The battery can provide power to the electronic components within retrofit sensor module 200. Slotted coin cell cover 260 can be sealed to housing side 220 by an O-ring or another gasketing method to prevent moisture or dust entering the interior of the housing. Slotted coin cell cover 260 includes slot 262 which provides a user a way to rotate and open the slotted coin cell cover 260 relative to housing side 220 using a coin-shaped battery (such as the battery to be enclosed in the housing or recently removed from the housing) or similar coin-shaped object.

Figure 3:
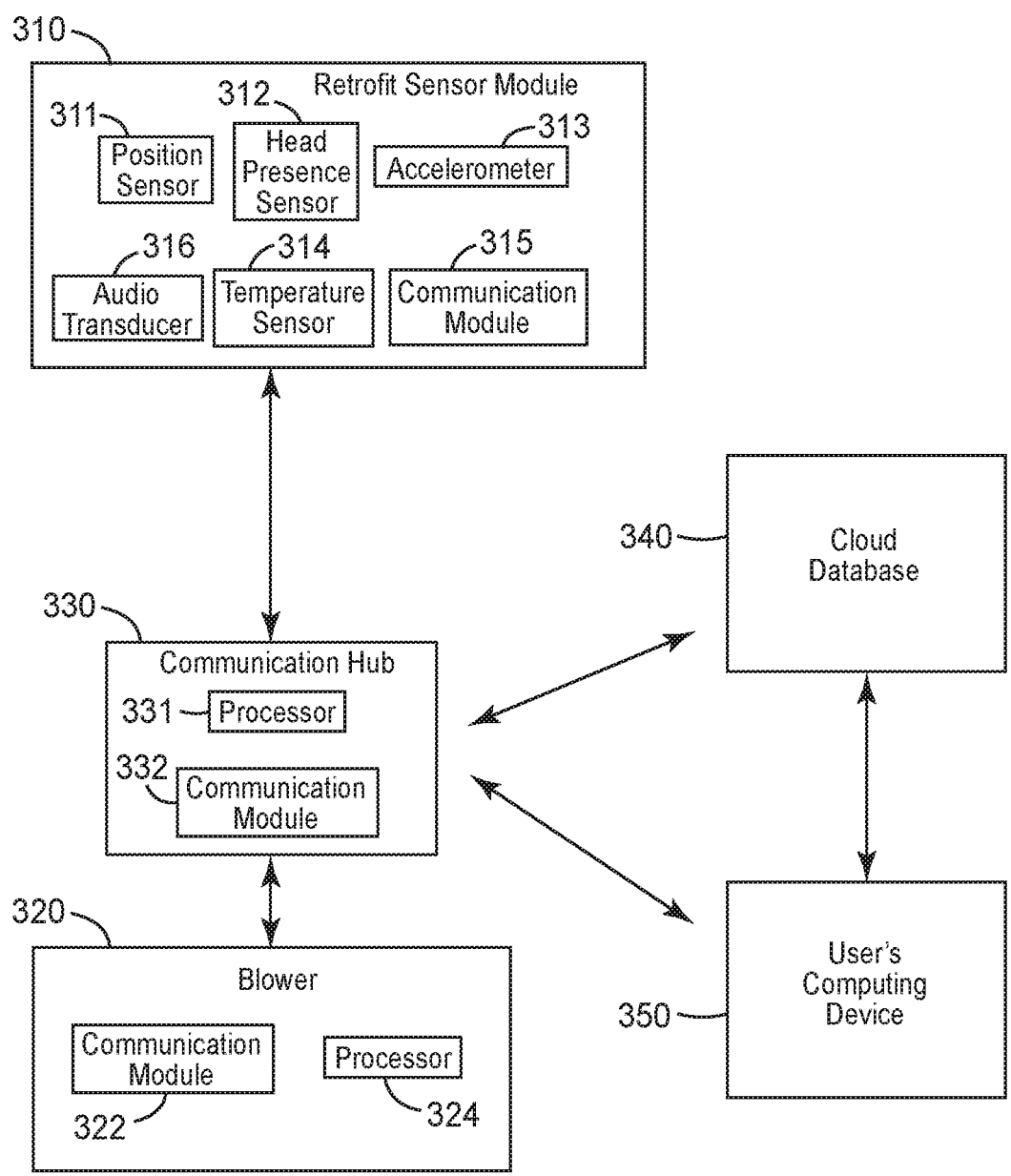
FIG. 3 is a system diagram of the electronic components in a retrofit sensor module.

FIG. 3 is a system diagram of the electronic components in a retrofit sensor module 310. FIG. 3 also shows how retrofit sensor module 310 may electronically interface with other components in a safety system. Retrofit sensor module 310 includes position sensor 311, head presence sensor 312, accelerometer 313, temperature sensor 314, communication module 315 and audio transducer 316. Position sensor 311 detects the position of the visor relative to the helmet of the protective head top. In some instances, position sensor 311 may detect whether visor 112 is partially open, and if so, what measure (e.g., percent or degree) it is open. As an example, the position sensor 311 may be a gyroscope that computes angular yaw, pitch, and/or roll (in degrees or radians) of the visor relative to the helmet. In another example, the position sensor 311 may be a magnetometer that measures the change relative to a magnet installed in a component of the hinge assembly. A percent may be estimated respecting how open a visor is in relation to the helmet by determining the magnetic field strength or flux perceived by the position sensor 311. "Partially open" visor information can be used to denote that the user may be receiving eye and face protection for hazards while still receiving a reasonable amount of respiratory protection. This "partially open" visor state, if kept to short durations, can assist the user in face to face communications with other workers. Position sensor 111 can be a variety of types of sensors, for example, an accelerometer, gyro, magnet, switch, potentiometer, digital position sensor or air pressure sensor. Position sensor 111 can also be a combination of any of the sensors listed above, or any other types of sensors that can be used to detected the position of the visor relative to the helmet.

Head presence sensor 312 can detect whether the protective head top is being worn by a user at any given point in time. In one instance, head presence sensor 312 may be an infrared sensor. The location of the retrofit sensor module when installed in a protective head top near the suspension that supports the head top on a user's head allows an infrared sensor to be positioned to detect whether a user is wearing the protective head top. Other types of sensors that may be used to detect whether an individual is wearing the protective head top include a capacitive sensor, a reed switch, carbon dioxide sensor, passive optical sensor, thermal sensor or an electro-mechanical switch.

Accelerometer 313 can detect the movement of a user's head when the protective head top is being worn. Such motion detection can allow for identification of activity that may injure the worker. Additionally, if the protective head top with a retrofit sensor module is not worn, no motion will be detected by accelerometer 313, allowing the accelerometer 313 to be used to confirm when the head top is not being worn. Accelerometer 313 can be used to detect occurrence of an impact or a high acceleration fall to determine additional detail when dangerous events occur.

Temperature sensor 314 senses the ambient temperature in the interior of a protective head top when retrofit sensor module 310 is installed in a protective head top. Temperature sensor 314 may be used to gather information such as whether the visor is open in a high temperature environment, whether the individual wearing the protective head top is being exposed to a high degree of heat and whether the blower 320 is not circulated air within the interior of the protective head top.

Audio transducer 316 can analyze the noise level in an environment, such as the interior of the protective head top or the area just external to the protective head top and near the user's ear, especially in the absence of a user wearing hearing protection, to determine if an environment is safe or dangerous to a user's hearing. In some embodiments, audio transducer 316 may be located in a portion of the housing of the retrofit sensor module that is situated near a user's ear and exposed to an exterior environment to allow sensing of environmental noise levels and exposure. In some instances, audio transducer 316 may determine the origination location or direction of noise and alert the user to approaching objects or people.

Communications module 315 allows retrofit sensor module to communicate with other electronic devices, such as communication hub 330. A communication module may include a variety of communication capabilities, such as radio frequency identification (RFID) (including NFC), Bluetooth, including any generations of Bluetooth, such as Bluetooth low energy (BLE), any type of wireless communication, such as WiFi, Zigbee, radio frequency or other types of communication methods as will be apparent to one of skill in the art up one reading the present disclosure. Communication module 315 can electronically interface with sensors, such as position sensor 311, head presence sensor 312, temperature sensor 313, accelerometer 314 or audio transducer 316 such that it can transmit information from these sensors to other electronic devices, including communication hub 330.

Retrofit sensor module 310 may include other types of sensors or electronic components, such as a verbal communication module, a power source such as a battery and a processing component, a USB or other connection for recharging batteries or removing information and other electro-mechanical connections.

Communication hub 330 includes a processor 331, a communication module 332 and a power supply (not shown). The communication module 332 of communication hub 330 can include any desired communication capability, such as: RFID, Bluetooth, including any generations of Bluetooth technology, and WiFi communication capabilities. Communication hub 130 can also include any type of wireless communication capabilities, such as radio frequency or Zigbee communication.

Communication hub 330 power supply can provide power to both the processor and communication module. A rechargeable battery, such as a Lithium Ion battery, can provide a compact and long-life source of power. Communication hub 330 may be adapted to have electrical contacts exposed or accessible from the exterior of the hub to allow recharging the communication hub 330.

Communication hub 130 processor 331 can receive, store and process information. For example, communication module 332 in communication hub 330 may receive information from a communication module 315 in retrofit sensor module 310 or directly from the position sensor 311 indicating the position of the visor, whether the visor is open or closed, and at what time the visor position changed. Processor 331 in communication hub 330 can store this information and compare it with other information received. Other information received may include, for example, information from a user's computing device 350 environmental beacon or sensor (not shown) and information from cloud database 340. Communication hub 330 can further store rules, such as threshold information both for a length of time the visor is allowed to be in an open position before an alert is generated, and the level or type of contaminants that will trigger an alert. For example, when communication hub 330 receives information from an environmental beacon or sensor indicating that there are no known hazards in the environment, the threshold for the visor being in the open position may be infinite. If a hazard is present in the environment, then the threshold would be determined based upon the concern of the threat to the user. Radiation, dangerous gases, or toxic fumes would all require assignment of the threshold to be on the order of one second or less.

Thresholds for other variables, such as for head top interior temperature can be used to predict heat related illness and more frequent hydration and/or rest periods can be recommended to the user. Thresholds can be used to alert a user of a remaining amount of predicted battery run time. As the battery nears its remaining run time, the user can be notified/warned to complete their current task and seek a fresh battery. When a threshold is exceeded for a specific environmental hazard, an urgent alert can be given to the user to evacuate the immediate area.

Thresholds can be adjusted and individualized for a user based on factors such as the user's age, gender, or state of health. Thresholds related to remaining battery life can be adjusted based on anticipated time to don and doff PPE.

Blower 320 includes a motor and fan assembly that provides a pressurized source of air to the head top. Additionally, blower 320 includes a processor 324 and a communication module 322. Processor 324 may interface with other components within blower 320. For example, processor 324 may interface with the battery or power source for blower 320 to determine how much battery life remains for the particular battery at any given point in time. Processor 324 may also communicate with the motor controlling fan speed, to determine how much air is being forced through the filter in blower 320, and therefore estimate remaining filter life. Communication module 322 is in electrical communication with processor 324. Communication module 322 may include any desired communication capability, such as: RFID (including NFC), Bluetooth, including any generations of Bluetooth technology, and WiFi communication capabilities. Communication module 322 can also include any type of wireless communication capabilities, such as radio frequency or Zigbee communication. Communication module can communicate wirelessly with communication hub 330. In some instances, communication module may communicate with other devices, such as cloud database 340 and user computing device 350, such as a personal computer, mobile device or tablet.

Figure 4:
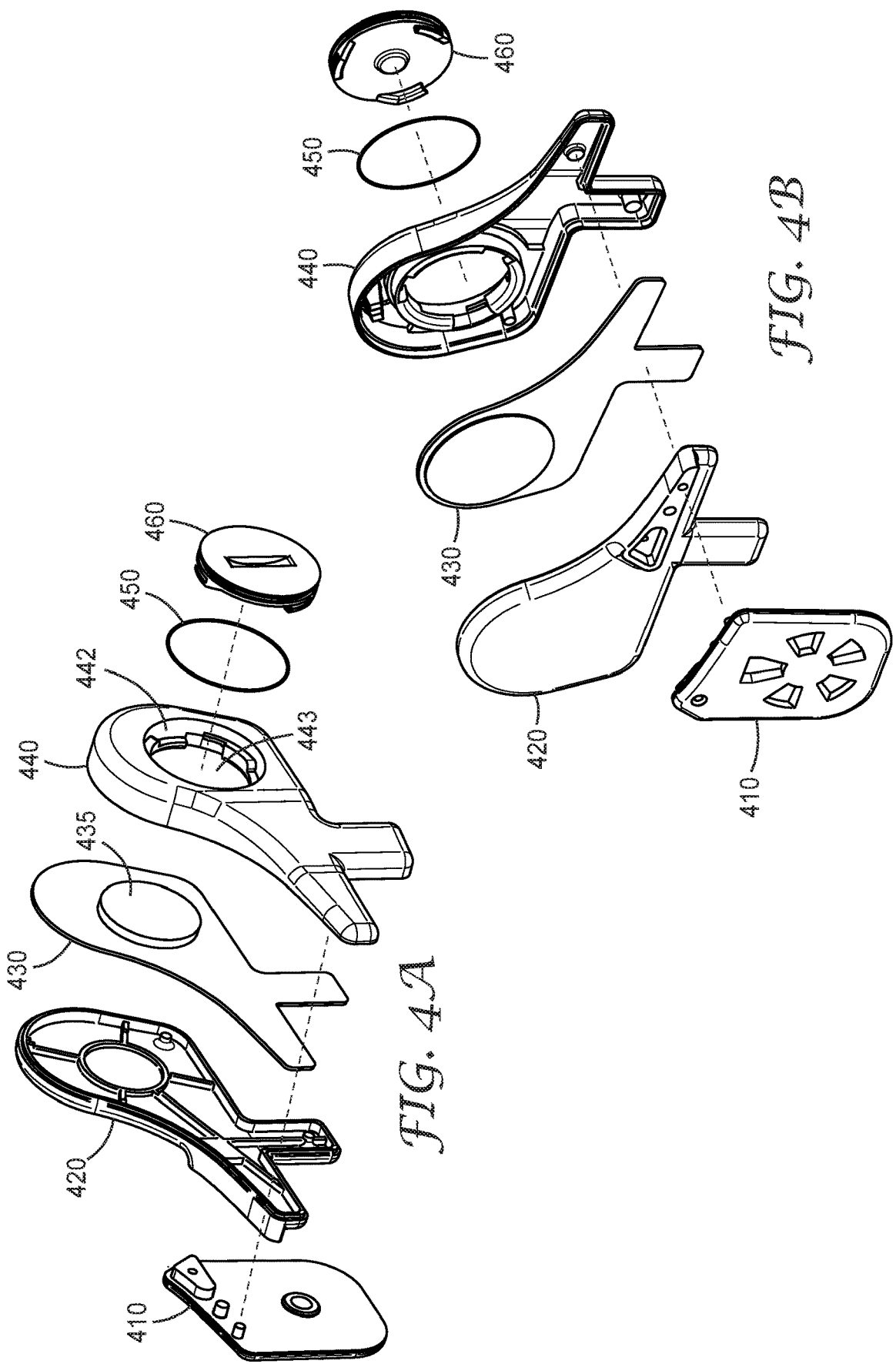
FIGS. 4a and 4b are exploded views of a retrofit sensor module.

FIGS. 4a and 4b are exploded views of a retrofit sensor module 400, showing each a perspective view of one side of the components in retrofit sensor module 400. Pivot socket cam 410 may be manufactured as a single component and later attached to retrofit sensor module housing 420, or may be manufactured as a continuous component with retrofit sensor module housing 420. In some configurations, pivot socket cam 410 serves as an attachment mechanism to attach retrofit sensor module 400 to the protective head top. Pivot socket cam 410 may be removably secured to the sensor housing 420. Pivot socket cam 410 may be an integral part of or permanently secured to the retrofit sensor module housing.

Pivot socket cam 410 has two sides, shown in FIGS. 4a and 4b, respectively. Pivot socket cam 410, in the embodiment shown, replaces a component of the hinge assembly in a protective head top. Specifically, the side of pivot socket cam 410 shown in FIG. 4b makes visible the detents that mate with a socket cam of the protective head top hinge assembly. In some configurations, pivot socket cam 410 may optionally include an annular (or other) retaining feature, sometimes also referred to as a boss, on the same side as the detents to increase security and better retain the retrofit sensor module in its installed location in the protective head top. In some other embodiments, the sensor module does not replace any components of the hinge when installed in the protective head top. One advantage of the present invention is that the installation of the sensor module does not impair the performance of the hinge when it is installed in the protective head top.

The side of pivot socket cam shown in FIG. 4a includes a small boss that seats into a molded pocket within the helmet. Bosses may be any shape, such as a square, trapezoid, or any shape used to mate to existing features of a protective helmet or components of a hinge assembly. The feature provides a mechanical interference that further prevents the retrofit sensor module from inadvertently being dislodged from the protective head top, especially in the instance the wearer of the helmet experiences a top impact while wearing the helmet.

Retrofit sensor module housing side 420 includes several ribs (visible in FIG. 4*a*) adding stability to the housing, slightly spacing the back side of printed circuit board 430 from the interior surface of retrofit housing side 420 to allow cooling of the components mounted on the PCB.

Printed circuit board (PCB) 430 hosts the electronic components in retrofit sensor module 400. While other methods of integrating electronic packages into devices will be apparent to one of skill in the art upon reading the present disclosure, use of a PCB to mount and connect components is shown in this embodiment. PCB may host a variety of components, including sensors, communication modules, processors and other components. PCB has mounted on it a set of springs to create an electrical contact with coin cell battery 435. Coin cell battery 435 is not secured to the PCB in the embodiment shown in FIGS. 4*a* and 4*b*, but rather in contact with it. This allows coin cell battery 435 to be replaced. In some embodiments, coin cell battery 435 can be replaced without tools when retrofit sensor module is installed in a protective head top.

Retrofit sensor module housing side 440 can be manufactured through a molding process and permanently attached to retrofit sensor module housing 420 using processes such as adhesives and ultrasonic welding. Retrofit sensor housing module side 440 includes opening 443 by which a coin cell battery 435 can be accessed and replaced. Retrofit sensor housing module side 440 includes lip 442, which provides a resting location for O-ring 450. O-ring 450 provides a tight seal between retrofit sensor housing module 442 and slotted coin slot cover 460. This tight seal, along with other manufacturing and design choices allows the retrofit sensor module to achieve various ingress protection (IP) ratings defined by the IEC 60529 standard, managed by the American National Standards Institute (ANSI). For example, in one embodiment, the retrofit sensor module may have an IP rating of 67, indicative of its respective solid protection and liquid protection ratings. Lower or higher ratings may be used depending on the likely environment for use for the retrofit sensor module and the protective head top it is installed in.

Figure 5:
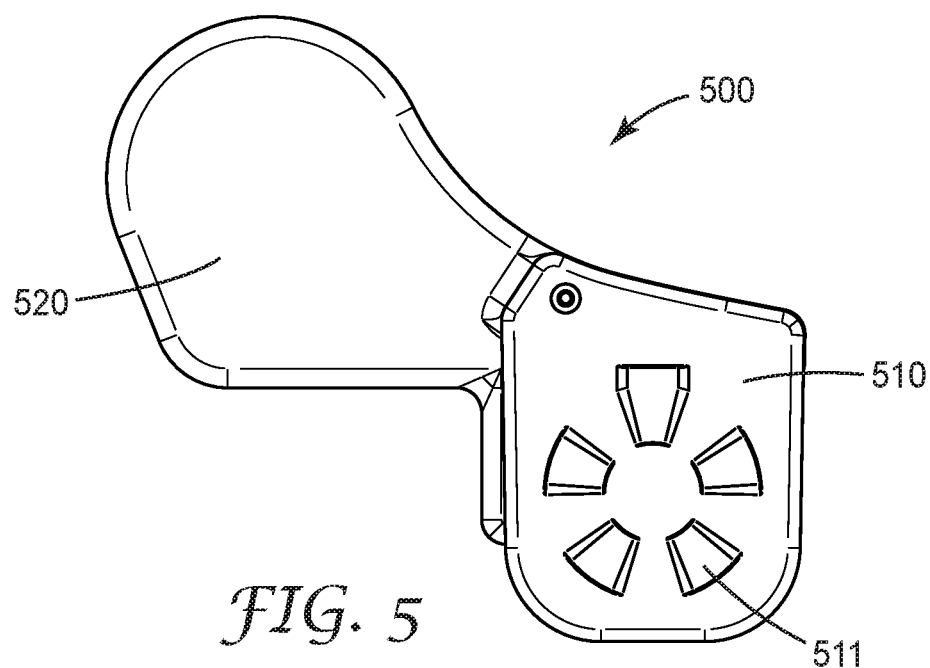
FIG. 5 is a first side of a retrofit sensor module.

FIG. 5 is a first side of a retrofit sensor module 500. This view of retrofit sensor module 500 shows a retrofit sensor module housing side 520 and pivot socket cam 510. Pivot socket cam 510 includes detents that mate with a socket cam of the protective head top hinge assembly.

Figure 6:
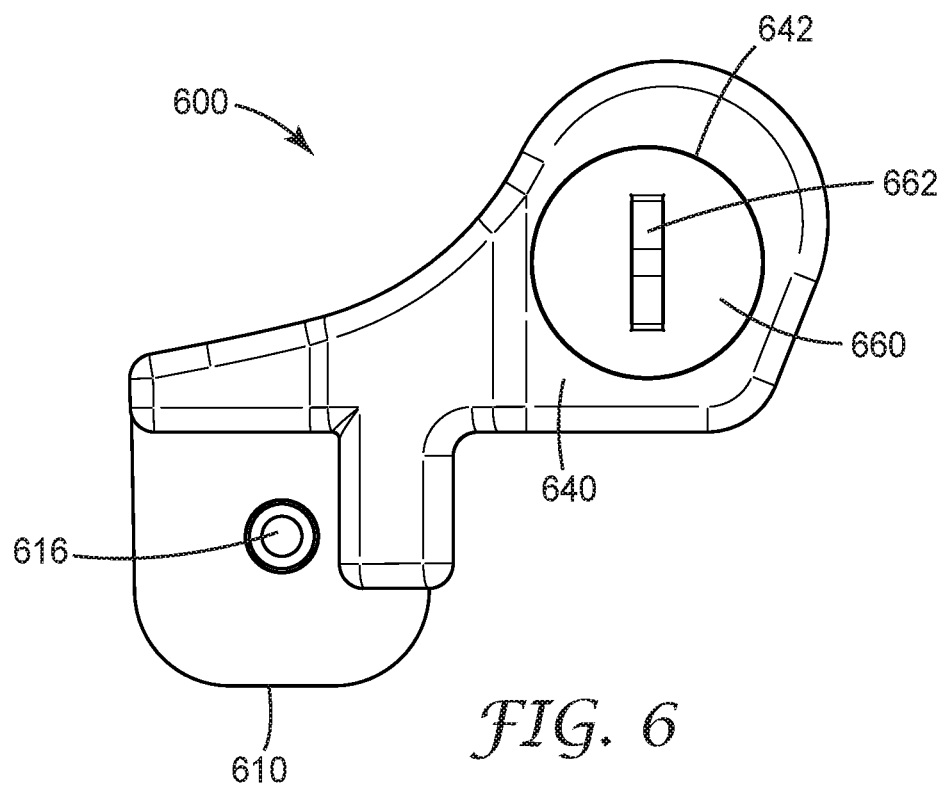
FIG. 6 is a second side of a retrofit sensor module.

FIG. 6 is a second side of a retrofit sensor module 600. This view of retrofit sensor module 600 shows a retrofit sensor module housing side 640, the back side of pivot socket cam 610, which includes boss 616, slotted coin cell cover 660 that fits into coin cell opening 642. Slotted coin cell cover includes slot 662 which allows coin cell cover to be removed from retrofit sensor module housing side 640 with only the use of a coin cell battery or other coin-shaped object or a fingernail and no other tools.

Figure 7A:
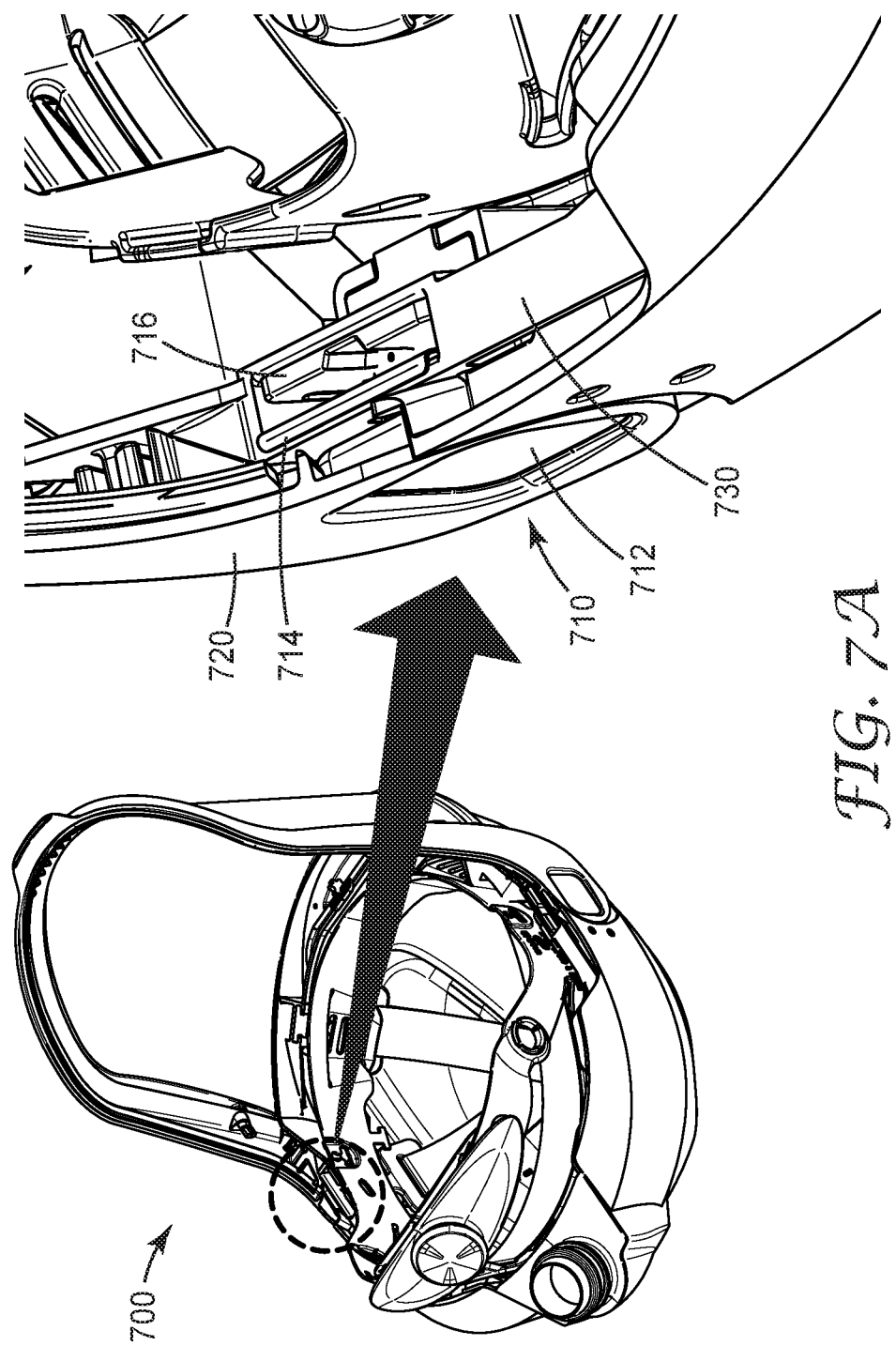
FIG. 7a is an enlarged view of a hinge assembly in a protective head top.
Figure 7B:
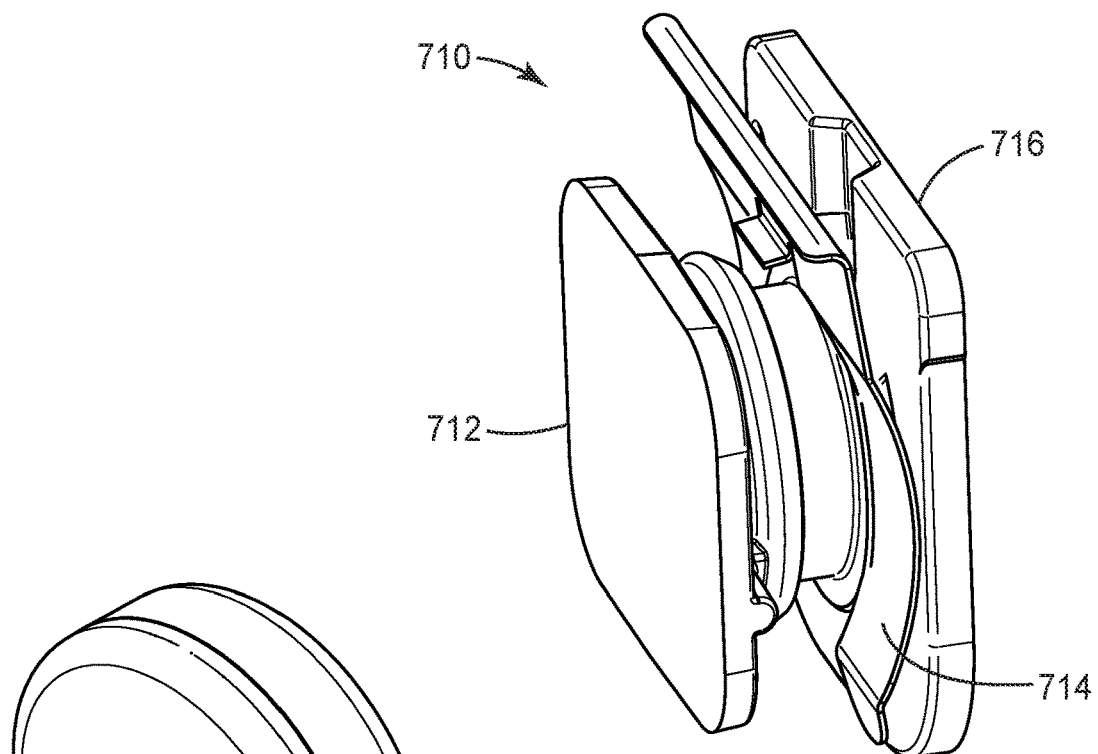
FIG. 7b is an exemplary hinge assembly for a protective head top.

FIG. 7*a* is an enlarged view of a hinge assembly 710 in a protective head top 700. FIG. 7*b* is an exemplary hinge assembly for a protective head top.

While any number of protective head tops could be used consistent with the scope of the present disclosure, some exemplary head tops include the 3M M-Series Headgear Family, available for purchase from 3M Company of St. Paul, Minn. This family of headgear includes the M-100 Series Faceshields, the M-300 Series Hardhats and the M-400 Series Helmets.

Hinge assembly 710 includes three main components: socket cam 712, spring clip 714 and pivot socket cam 716. The hinge assembly 710 functions in a manner such that as the visor 720 of the protective head top 700 is opened, the socket cam 712 rotates with the visor and unseats from the detents within the pivot socket cam 716. Once the male features of the socket cam 712 find the next series of detents in the pivot socket cam 716, the visor snaps into that position. The spring clip 714 provides the force to hold the socket cam features within the pivot socket cam 716 detents.

Hinge assembly 710 can be removed from protective head top 700 by first removing spring clip 714. Spring clip 714 can be removed by squeezing the edge of the spring clip 714 toward the pivot socket cam 716 and pulling the spring clip out from the opening 730 in the rim of the protective head top. After the spring clip 714 is removed, visor 720 and frame assembly along with socket cam 712 can be pulled away from the opening in the side of protective head top. Pivot socket cam 716 can then be slid out of opening 730 in the rim of protective head top.

Figure 8:
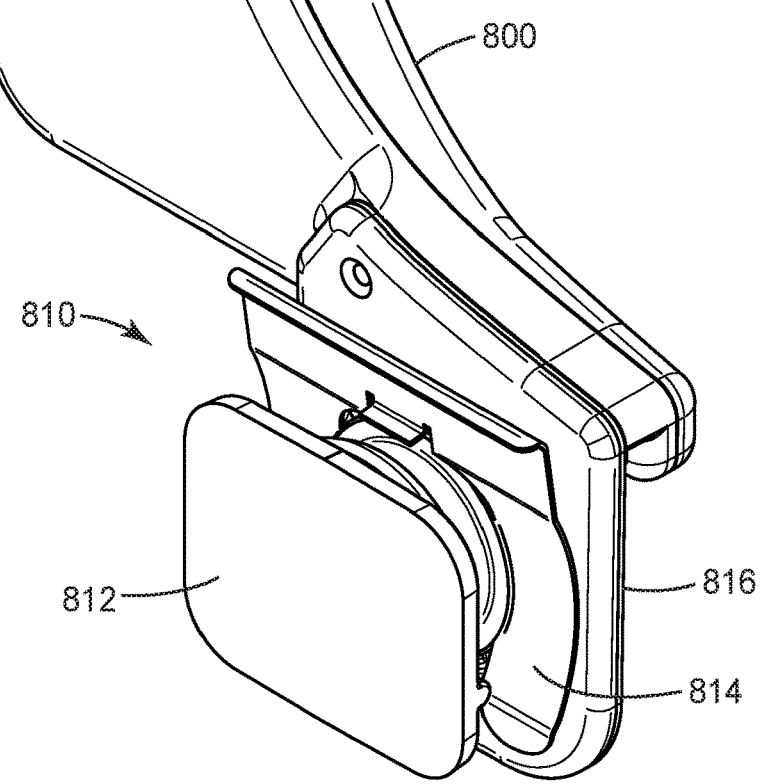
FIG. 8 shows a retrofit sensor module mated to hinge assembly components.

FIG. 8 shows a retrofit sensor module 800 mated to a hinge assembly component. Specifically, retrofit sensor module 800 includes attachment mechanism 816, which serves as a replacement for pivot socket cam 716 in hinge assembly 810. Attachment 816 can replicate the pivot socket cam features as shown in FIG. 4*b*.

Figure 9A:
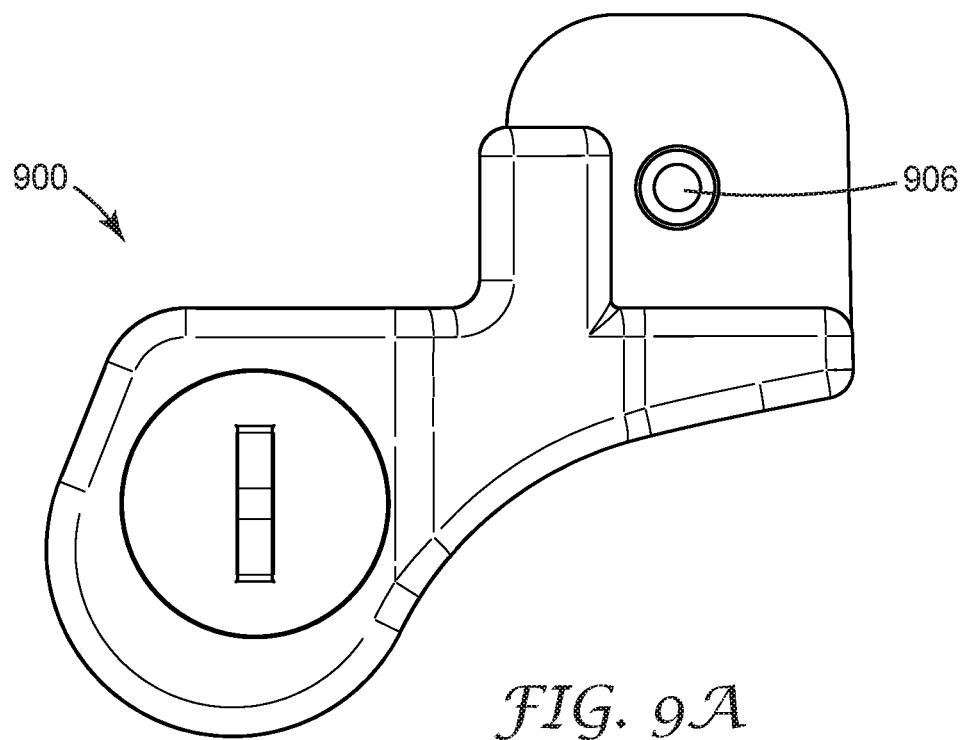
FIGS. 9a and 9b shows a feature on the retrofit sensor module that matches a feature on the rear side of the pivot socket cam.
Figure 9B:
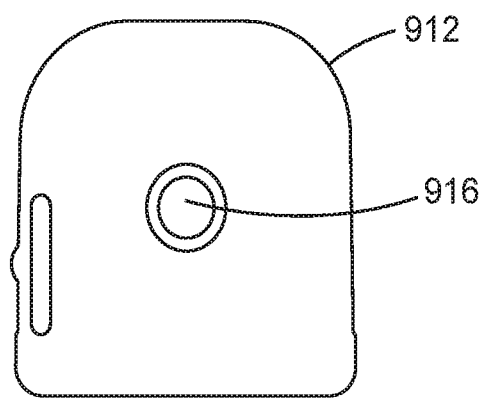

FIGS. 9*a* and 9*b* show a boss feature 906 on the retrofit sensor module 900 that matches a boss feature 916 on the rear side of the pivot socket cam 912. The boss feature on each of retrofit sensor module 900 and socked cam pivot 912 seats into a molded pocket within the helmet shell and provides a mechanical interference that further prevents the part from being dislodged from the helmet.

Figure 10A:
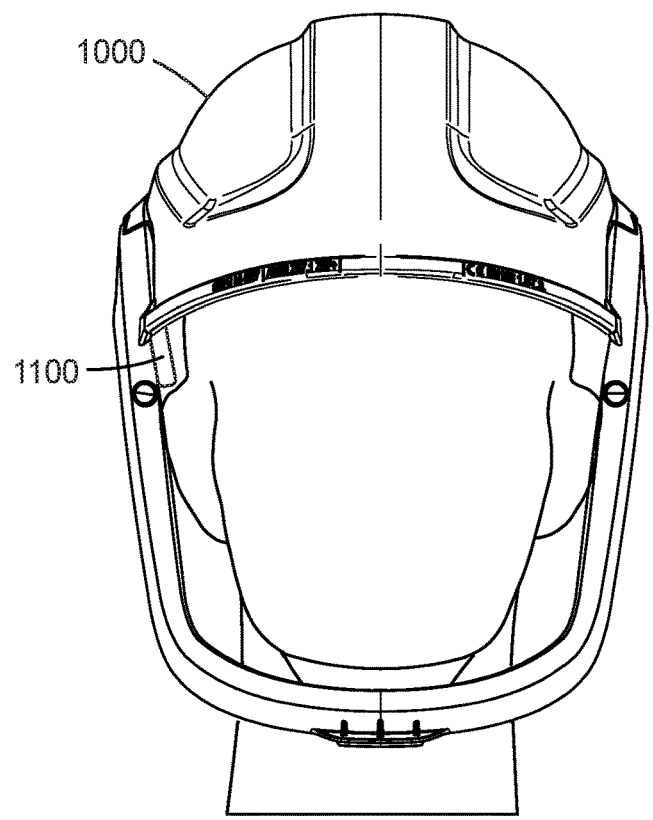
Figure 10B:
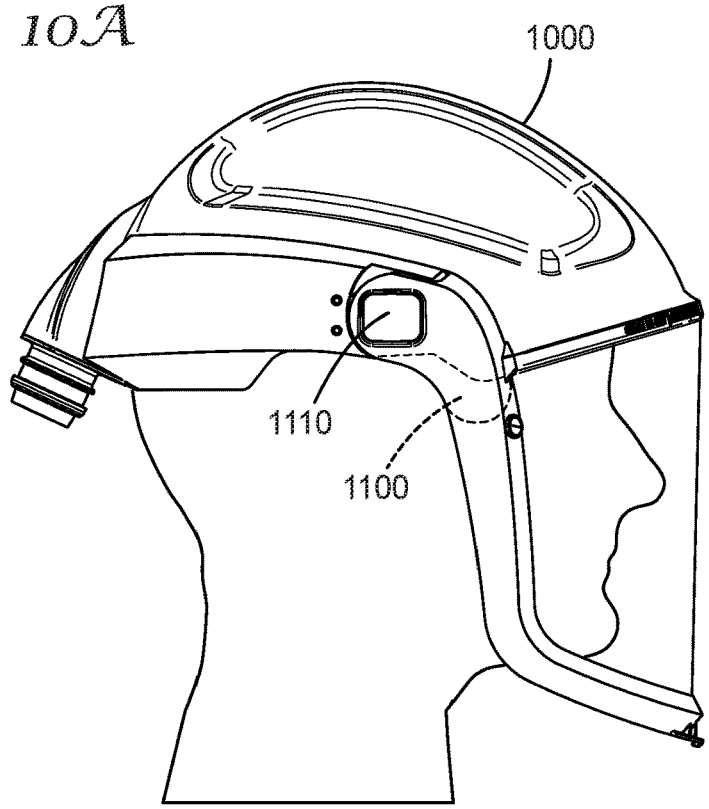

FIGS. 10*a*-10*c* show the retrofit sensor module 1100 installed in a protective head top 1000. FIGS. 10*a* and 10*b* show front and side views respectively of retrofit sensor module 1100 and protective head top 1000. As can be seen from FIG. 10*b*, when retrofit sensor module is installed in protective head top 1000, the sensor module fits in the interior of the visor when the visor is in a down position.

Retrofit sensor module 1100 can be installed in protective head top 1000 without the use of any tools. To install retrofit sensor module 1100, the hinge assembly must first be removed as discussed with respect to FIGS. 7*a* and 7*b*. After the hinge assembly is removed, the attachment mechanism portion of the retrofit sensor module 1100 can be inserted into the opening in the frame of the protective head top where the pivot socket cam once was. After the retrofit sensor module 1100 is in position, the socket cam 1112 can be reinserted through the opening in the frame of the protective head top to mate with the attachment mechanism portion of the retrofit sensor module 1100 that imitates that pivot socket cam. The spring clip 1114 can then be reinserted to create force between the retrofit sensor module 1100 and the socket cam.

In some instances, where the position sensor in the retrofit sensor module is a magnetometer, a magnet may be inserted into, attached to, or otherwise incorporated into the socket cam. This allows the magnetometer to detect the motion of the visor relative retrofit sensor module because the motion socket cam of the socket cam relative to the retrofit sensor module is the same as or comparable to the motion of the visor relative to the helmet of the protective head top.

Other configurations for use of a magnetometer or a magnet used for sensing the position of the visor are included in the scope of the present disclosure. The magnet may be physically installed in a variety of was as will be apparent to one of skill in the art upon reading the present disclosure. Other locations and methods of magnet attachment will be apparent to one of skill in the art upon reading the present disclosure.

In some instances, the retrofit sensor module can be sold as a kit along with a communication hub. The retrofit sensor module may be designed to communicate with the sensor hub via Bluetooth. In some instances, the retrofit sensor module be require minimal or no calibration by the user. In some instances, that kit may further include a replacement socket cam that includes a magnet for purposes of allowing a magnetometer in the retrofit sensor module to detect the position of the visor relative to the helmet. In some instances, the kit may further include a protective head top.

FIG. 11 shows a retrofit sensor module 1110 superimposed onto its installation location in a protective head top 1100.

FIG. 12 shows an alternate embodiment for a retrofit sensor module 1200. In the illustrated embodiment, the retrofit sensor module includes clip 1215 to serve as an attachment mechanism, to attach the retrofit sensor module to the socket cam or to another component of a hinge assembly. Clip 1215 is designed so that its legs snap around the cam socket and its feet seat into the pivot sockets.

Many other embodiments and methods for attaching retrofit sensor module to a hinge assembly of a protective head top will be apparent to one of skill in the art upon reading the present disclosure.

Other variations on the retrofit sensor module are also within the scope of this disclosure. For example, in some instances the sensor module includes a user interface, and the user interface comprises at least one LED. A user interface may include other features that allow it to communicate with the user, such as a power button or switch, a speaker to transmit audio messages, a vibration ability for the purpose of alarming, a display or a light.

It will be appreciated that numerous and varied other arrangements may be readily devised by those skilled in the art without departing from the spirit and scope of the invention as claimed.

It will be appreciated that based on the above description, aspects of the disclosure include methods and systems for determining time of use (wear time) of articles, such as PPE articles, by determining if they satisfy at least one criterion.

Although the methods and systems of the present disclosure have been described with reference to specific exemplary embodiments, those of ordinary skill in the art will readily appreciate that changes and modifications may be made thereto without departing from the spirit and scope of the present disclosure.

In the present detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above or on top of those other elements.

As used herein, when an element, component, or layer for example is described as forming a "coincident interface" with, or being "on," "connected to," "coupled with," "stacked on" or "in contact with" another element, component, or layer, it can be directly on, directly connected to, directly coupled with, directly stacked on, in direct contact with, or intervening elements, components or layers may be on, connected, coupled or in contact with the particular element, component, or layer, for example. When an element, component, or layer for example is referred to as being "directly on," "directly connected to," "directly coupled with," or "directly in contact with" another element, there are no intervening elements, components or layers for example. The techniques of this disclosure may be implemented in a wide variety of computer devices, such as servers, laptop computers, desktop computers, notebook computers, tablet computers, hand-held computers, smart phones, and the like. Any components, modules or units have been described to emphasize functional aspects and do not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. Additionally, although a number of distinct modules have been described throughout this description, many of which perform unique functions, all the functions of all of the modules may be combined into a single module, or even split into further additional modules. The modules described herein are only exemplary and have been described as such for better ease of understanding.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

What is claimed is:

1. A system comprising:
   a sensor module comprising:
   a temperature sensor configured to sense ambient temperature in an interior portion of a head top of an article of personal protective equipment configured to be worn by a person;
   a position sensor configured to sense a position of a visor of the head top;
   an attachment mechanism configured to mate the sensor module with the head top, wherein the visor is configurable to move to a plurality of positions; and
   a first communication device configured to communicate with a communication hub configured to be used by the person; and
   the communication hub comprising a computing device, the computing device comprising:
   a second communication device configured to communicate with the sensor module;
   one or more computer processors; and
   a memory, wherein the memory comprises instructions that when executed by the one or more computer processors cause the one or more computer processors to:
   perform an operation in response to a determination, based at least in part on data received from the sensor module, that the head top of the article of personal protective equipment sensed the ambient temperature in the interior portion of the head top and the visor is in a particular position of the plurality of positions.

2. The sensor module of claim 1 further comprising a battery.

3. The sensor module of claim 1 further comprising an accelerometer to sense movement of a head of the person wearing the head top.

4. The sensor module of claim 1 further comprising an audio transducer.

5. The sensor module of claim 1, further comprising a user interface, wherein the user interface comprises at least one light-emitting diode (LED).

6. The sensor module of claim 1, wherein the attachment mechanism is configured to replace a hinge component of the head top.

7. The sensor module of claim 1, wherein the sensor module is not configured to replace any components of a hinge assembly when installed in the head top.

8. The sensor module of claim 1, wherein the sensor module is configured to be installed without using any tools.

9. The sensor module of claim 1, wherein the sensor module is configured to fit in an interior of the visor of the head top when the sensor module is installed in the head top and when the visor is in a down position.

10. The sensor module of claim 1, wherein the sensor module does not impair the performance of a hinge assembly when installed in the head top.

11. The sensor module of claim 1, wherein the attachment mechanism is removably secured to the sensor module.

12. The sensor module of claim 1, wherein the attachment mechanism is an integral part of or permanently secured to the sensor module.

13. The sensor module of claim 2, wherein the battery is configured to be replaced without the use of any tools while the sensor module is installed in the head top.

14. The sensor module of claim 1, wherein the sensor module has an Ingress Protection (IP) rating.

15. The sensor module of claim 1, wherein the sensor module further comprises a Bluetooth communication component.

16. The sensor module of claim 1, wherein a head presence sensor comprises an infrared sensor.

17. The system of claim 1, wherein to perform the operation, the memory comprises instructions that when executed by the one or more computer processors cause the one or more computer processors to send information to a remote computing device.

18. The system of claim 1, wherein the information at least comprises the data received from the sensor module or is based at least in part on the data received from the sensor module.

19. The system of claim 1, wherein to perform the operation, the memory comprises instructions that when executed by the one or more computer processors cause the one or more computer processors to generate at least one of an audible or visual output.

20. The system of claim 1, wherein to perform the operation, the memory comprises instructions that when executed by the one or more computer processors cause the one or more computer processors to perform a comparison based at least in part on the data received from the sensor module and at least one other set of data.

21. The system of claim 20, wherein the at least one other set of data comprises data from an environmental beacon, a sensor in a work environment, or a remote computing device.

22. The system of claim 21, wherein to perform the operation, the memory comprises instructions that when executed by the one or more computer processors cause the one or more computer processors to determine a threshold based at least in part on a detected hazard in the work environment.

23. The system of claim 22, wherein the threshold is at least one of adjustable or individualizable based at least in part on a factor associated with the person.

24. The system of claim 1, wherein to perform the operation, the memory comprises instructions that when executed by the one or more computer processors cause the one or more computer processors to predict a physiological condition of the person based at least in part on the data received from the sensor module.

25. The system of claim 24, wherein to perform the operation, the memory comprises instructions that when executed by the one or more processors cause the one or more computer processors to predict a heat related illness for the person.

26. The system of claim 1, wherein to perform the operation, the memory comprises instructions that when executed by the one or more processors cause the one or more computer processors to indicate at least one of a hydration event or rest period to the person.

27. A computing device comprising:
one or more computer processors; and
a memory comprising instructions that when executed by the one or more computer processors cause the one or more computer processors to:
receive data from a sensor module, configured for an article of personal protective equipment, comprising (a) a temperature sensor configured to sense ambient temperature in an interior portion of a head top of the article of personal protective equipment configured to be worn by a person; (b) a position sensor configured to sense a position of a visor of the head top; an attachment mechanism configured to mate the sensor module with the head top, wherein the visor is configurable to move to a plurality of positions; and (c) a first communication device configured to communicate with a communication hub configured to be used by the person; and
perform an operation in response to a determination, based at least in part on the data received from the sensor module, that the head top of the article of personal protective equipment sensed the ambient temperature in the interior portion of the head top and the visor is in a particular position of the plurality of positions.

28. A non-transitory computer-readable storage medium encoded with instructions that, when executed, cause at least one processor of a computing device to:
receive data from a sensor module, configured for an article of personal protective equipment, comprising (a) a temperature sensor configured to sense ambient temperature in an interior portion of a head top of the article of personal protective equipment configured to be worn by a person; (b) a position sensor configured to sense a position of a visor of the head top; an attachment mechanism configured to mate the sensor module with the head top, wherein the visor is configurable to move to a plurality of positions; and (c) a first communication device configured to communicate with a communication hub configured to be used by the person; and
perform an operation in response to a determination, based at least in part on the data received from the sensor module, that the head top of the article of personal protective equipment sensed the ambient temperature in the interior portion of the head top and the visor is in a particular position of the plurality of positions.

* * * * *